(12) United States Patent
Kanamaru

(10) Patent No.: US 9,942,444 B2
(45) Date of Patent: Apr. 10, 2018

(54) IMAGE FORMING APPARATUS

(71) Applicant: KYOCERA Document Solutions Inc., Osaka (JP)

(72) Inventor: Kazuhiro Kanamaru, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 91 days.

(21) Appl. No.: 15/009,255

(22) Filed: Jan. 28, 2016

(65) Prior Publication Data

US 2016/0227074 A1 Aug. 4, 2016

(30) Foreign Application Priority Data

Jan. 30, 2015 (JP) .................................. 2015-016756

(51) Int. Cl.
| | | |
|---|---|---|
| G06F 15/00 | (2006.01) | |
| H04N 1/44 | (2006.01) | |
| H04N 1/00 | (2006.01) | |
| G06K 9/00 | (2006.01) | |
| G06K 9/20 | (2006.01) | |

(52) U.S. Cl.
CPC ....... *H04N 1/4493* (2013.01); *G06K 9/00442* (2013.01); *G06K 9/2063* (2013.01); *H04N 1/0057* (2013.01); *H04N 1/00572* (2013.01); *H04N 1/00803* (2013.01); *H04N 2201/0094* (2013.01)

(58) Field of Classification Search
CPC ............... H04N 1/4493; H04N 1/0057; H04N 1/00572; H04N 1/00803; G06K 9/00442; G06K 9/2063

USPC ............................................... 358/3.24, 1.13
See application file for complete search history.

(56) References Cited

U.S. PATENT DOCUMENTS

| | | | | |
|---|---|---|---|---|
| 8,757,063 | B2 * | 6/2014 | Alshinnawi | B41J 11/008 101/483 |
| 2009/0066987 | A1 * | 3/2009 | Inokuchi | G03G 15/36 358/1.13 |
| 2009/0161129 | A1 * | 6/2009 | Lek | G06K 15/16 358/1.9 |
| 2011/0292453 | A1 * | 12/2011 | Saluja | B41J 13/0036 358/3.28 |

FOREIGN PATENT DOCUMENTS

JP 2001-228751 A 8/2001

\* cited by examiner

*Primary Examiner* — Mark R Milia
(74) *Attorney, Agent, or Firm* — Studebaker & Brackett PC

(57) ABSTRACT

An image forming apparatus includes a scanning section, a storage section, an image forming section, and a control section. The scanning section scans an image formed on a first side of the recording medium to obtain scanned image data. The storage section stores therein specific information data indicating a specific image or a specific character string. The control section controls the scanning section and the image forming section. The image forming section forms an image based on input image data on a second side of the recording medium. The control section determines whether or not the input image data includes the specific information data and the scanned image data includes the specific information data and determines based on a result of the determination whether or not to control the image forming section to form a masking image on the first side of the recording medium.

8 Claims, 6 Drawing Sheets

IMAGE FORMING APPARATUS

INCORPORATION BY REFERENCE

The present application claims priority under 35 U.S.C. § 119 to Japanese Patent Application No. 2015-016756, filed Jan. 30, 2015. The contents of this application are incorporated herein by reference in their entirety.

BACKGROUND

The present disclosure relates to image forming apparatuses.

For the purpose of economical use of resources, an image forming apparatus may perform generally-called backside printing. Backside printing is printing through reuse of a sheet (recording medium) bearing an image on only one side thereof, to form an image that a user requests on the other side of the sheet. Of a sheet used for backside printing, the side of the sheet on which an image has been already formed is hereinafter referred to as a first side and the other side opposite to the first side is referred to as a second side.

In a situation in which an image containing confidential information such as a personal name, business connection name, telephone number, knowhow information, etc. (a confidential information image) is formed on the first side of a sheet that is to be used in backside printing, there is a demand for masking of the confidential information image in order to prevent leakage of the confidential information. A certain image forming apparatus (device for processing a sheet subjected to imaging) masks a confidential information image through masking processing.

The image forming apparatus scans an image formed on the first side of a sheet in the masking processing. The image forming apparatus then masks the confidential information image based on the scanned image. In a situation, for example, in which the scanned image includes a hatched portion, the image forming apparatus forms and layers an image including a black sloid pattern portion located in correspondence with the hatched portion on the image formed on the first side of a sheet. In a situation in which the scanned image includes a specific sign, the image forming apparatus forms and layers an image of a black solid pattern corresponding to the entire region of the scanned image on the image formed on the first side of the sheet.

SUMMARY

An image forming apparatus according to the present disclosure is an image forming apparatus that forms an image on a recording medium. The recording medium has a first side and a second side opposite to the first side. The image forming apparatus includes a scanning section, a storage section, an image forming section, and a control section. The scanning section scans an image formed on the first side of the recording medium to obtain scanned image data. The storage section stores therein data of specific information indicating a specific image or a specific character string. The image forming section forms an image on the recording medium. The control section controls the scanning section and the image forming section. The image forming section forms an image based on input image data on the second side of the recording medium. The control section determines whether or not the input image data includes the data of the specific information and the scanned image data includes the data of the specific information and determines based on a result of the determination whether or not to control the image forming section to form a masking image on the first side for masking a portion of the image on the first side that indicates the specific information.

DETAILED DESCRIPTION

Figure 1:
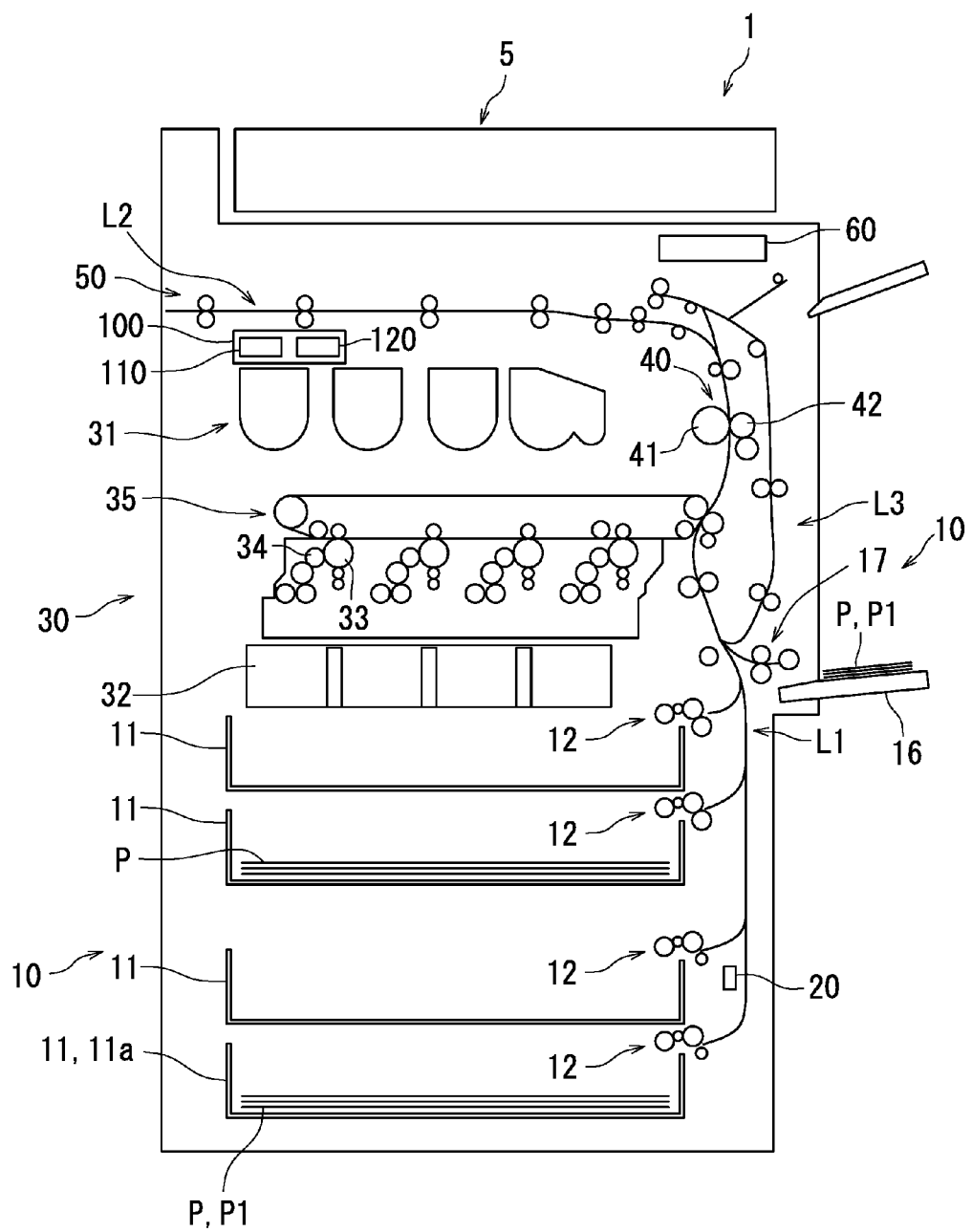
FIG. 1 is a schematic diagram illustrating an image forming apparatus according to a first embodiment of the present disclosure.

Embodiments of the present disclosure will be described below with reference to the accompanying drawings. Elements that are the same or equivalent are indicated by the same reference signs in the drawings, and description thereof is not repeated.

First Embodiment

FIG. 1 is a schematic diagram illustrating an image forming apparatus 1 according to a first embodiment of the present disclosure. The image forming apparatus 1 in the present embodiment is a color copier. The image forming apparatus 1 includes a dedicated sheet feed cassette 11a that accommodates a sheet P to be used in backside printing. The sheet P is an example of a recording medium. A sheet P to be used in backside printing among sheets P may be hereinafter referred to as a backside printing sheet P1. An image has been already formed on a first side of the backside printing sheet P1. In a situation in which an image formed on the first side of a backside printing sheet P1 contains confidential information, the image forming apparatus 1 in the present embodiment performs masking processing for masking the confidential information. The image forming apparatus 1 then reverses the backside printing sheet P1 and forms on a second side of the backside printing sheet P1, an image (input image) that a user requests to form.

As illustrated in FIG. 1, the image forming apparatus 1 includes a document scanning section 5, a sheet feed section 10, a line sensor 20, an image forming section 30, a fixing section 40, an ejection section 50, an input and output section 60, and a control board 100. The image forming apparatus 1 further includes a first conveyance section L1, a second conveyance section L2, and a third conveyance section L3.

The document scanning section 5 scans an original document to obtain input image data.

The sheet feed section 10 includes a plurality of sheet feed cassettes 11 and a plurality of first sheet feed roller groups 12. Each of the sheet feed cassettes 11 is capable of accommodating a plurality of sheets P. At least one dedicated sheet feed cassette 11a is included in the sheet feed cassettes 11. The first sheet feed roller groups 12 each feed the sheets P accommodated in a corresponding one of the sheet feed cassettes 11 one at a time to the first conveyance section L1.

The sheet feed section 10 further includes a manual feed tray 16 and a second sheet feed roller group 17. The manual feed tray 16 is capable of being loaded with a plurality of sheets P. The second sheet feed roller group 17 feeds the sheets P loaded on the manual feed tray 16 one at a time to the first conveyance section L1.

The first conveyance section L1 conveys the sheet P fed by the sheet feed section 10 to the fixing section 40 through a transfer device 35 included in the image forming section 30.

The line sensor 20 that is an example of a scanning section is disposed in the first conveyance section L1. Specifically, the line sensor 20 is disposed downstream of the dedicated sheet feed cassette 11a and upstream of the transfer device 35 in terms of a sheet conveyance direction. The line sensor 20 scans an image formed on the first side of a backside printing sheet P1 fed from the dedicated sheet feed cassette 11a. The line sensor 20 then generates scanned image data based on the scanned image. The image forming apparatus 1 may include an image sensor such as an area sensor, rather than the line sensor 20.

The image forming section 30 forms an image on the sheet P conveyed to the transfer device 35 by the first conveyance section L1. The image forming section 30 includes toner replenishment devices 31, exposure devices 32, photosensitive drums 33, and development rollers 34 in addition to the transfer device 35.

The toner replenishment devices 31 each replenish a corresponding one of the respective development rollers 34 with toner.

The exposure devices 32 each irradiate a corresponding one of the photosensitive drums 33 with a laser beam for exposure based on image data to form an electrostatic latent image. The electrostatic latent image is developed by a corresponding one of the development rollers 34 through supply of toner to a corresponding one of the photosensitive drums 33. Thus, a toner image is formed on the photosensitive drum 33.

The transfer device 35 transfers the toner image formed on the photosensitive drum 33 to the sheet P. The sheet P to which the toner image is transferred is conveyed to the fixing section 40. In a situation in which an image is to be formed using toners of plural colors, the transfer device 35 superimposes the toner images formed on the respective photosensitive drums 33 for the respective colors and transfers the superimposed toner images to the sheet P.

The fixing section 40 includes a heating member 41 and a pressure member 42. The fixing section 40 applies heat and pressure to the sheet P using the heating member 41 and the pressure member 42 to fix to the sheet P the toner image that has not been fixed yet.

The second conveyance section L2 conveys the sheet P conveyed from the fixing section 40 to the third conveyance section L3 or the ejection section 50.

The ejection section 50 ejects the sheet P outside the main body of the image forming apparatus 1.

The third conveyance section L3 is used in duplex printing and backside printing. The third conveyance section L3 reverses the sheet P conveyed from the second conveyance section L2 and then conveys the sheet P to the first conveyance section L1. Specifically, the third conveyance section L3 conveys the sheet P to a location downstream of the sheet feed section 10 in the first conveyance section L1 and upstream of the transfer device 35 in terms of the sheet conveyance direction. The reversed sheet P is then conveyed again by the first conveyance section L1. In the above configuration, an image based on the input image data is formed on each side of the sheet P in duplex printing. Alternatively, in backside printing, an image based on the input image data is formed on the second side of a backside printing sheet P1.

The input and output section 60 is disposed in the upper part of the main body of the image forming apparatus 1. The input and output section 60 displays an input screen. The input and output section 60 receives user input and generates input data according to the user input. The input and output section 60 then outputs a result processed by the control section 120. The input and output section 60 may be a touch panel or an operation panel including an operation button and a touch panel, for example.

A storage section 110 and a control section 120 are boarded on the control board 100. The storage section 110 stores therein programs, setting information, etc. The storage section 110 includes a hard disk drive (HDD), a random access memory (RAM), and a read only memory (ROM). The control section 120 executes control programs stored in advance in the storage section 110 to control operations of respective elements of the image forming apparatus 1.

The control section 120 in the present embodiment controls the respective elements of the image forming apparatus 1 so that a portion of an image on the first side of a backside printing sheet P1 that indicates confidential information is masked by backside printing. Specifically, the control section 120 determines whether or not to control the image forming section 30 to form a masking image on the first side of the backside printing sheet P1 based on a result of a scan by the document scanning section 5 (input image data) and a result of a scan by the line sensor 20 (scanned image data). Upon determining that the image formed on the first side of the backside printing sheet P1 contains the confidential information and an image to be formed on the second side of the backside printing sheet P1 does not contain the confidential information, the control section 120 generates image data (masking image data) of an image (masking image) to be layered on the image formed on the first side. The masking image data is for masking a portion of an image that indicates the confidential information. The control section 120 controls the image forming section 30 based on the masking image data to form the masking image on the first side of the backside printing sheet P1. Thus, the image (masking image) for masking the potion of the image that indicates the confidential information is layered on the image that has been already formed on the first side of the backside printing sheet P1, thereby masking the portion that indicates the confidential information. In the above manner, the image forming apparatus 1 forms the masking image on the first side of the backside printing sheet P1 according to the presence or absence of an image on the first side that contains the confidential information.

By contrast, upon determining that the image formed on the first side of the backside printing sheet P1 contains the confidential information and an image to be formed on the second side the backside printing sheet P1 contains the confidential information, the control section 120 controls the image forming section 30 to form an image based on the input image data on the second side without forming a masking image on the first side. In the above configuration, printed matter that a user recognizes that containment of the confidential information is not masked. As a result, toner consumption and leakage of confidential information can be reduced.

A masking image includes at least one masking portion. The masking portion masks a portion of the image on the first side of the backside printing sheet P1 that indicates the confidential information. The masking portion is located in the masking image in correspondence with to the portion of the image on the first side of the backside printing sheet P1 that indicates the confidential information (hereinafter referred to as a masking target region). That is, the image forming section 30 forms a masking image including the masking portion located in correspondence with the masking target region on the first side of the backside printing sheet P1, thereby masking the masking target region. As a result, the confidential information contained in the image formed on the first side of the backside printing sheet P1 is masked. In a situation in which the image formed on the first side of the backside printing sheet P1 does not contain the confidential information, the image forming section 30 does not form any masking image on the first side.

Figure 2:
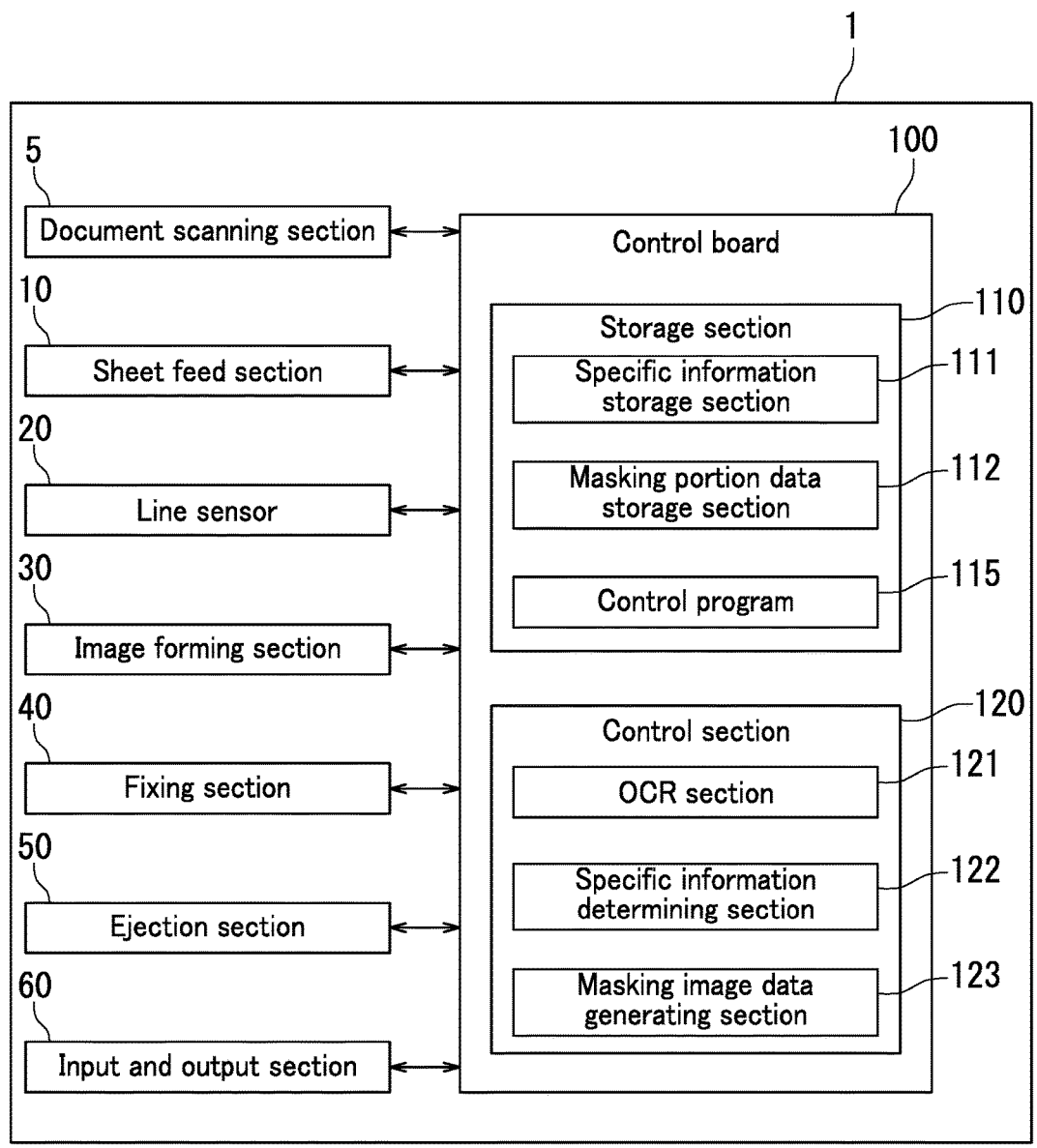
FIG. 2 is a block diagram of the image forming apparatus according to the first embodiment of the present disclosure.

The storage section 110 and the control section 120 of the image forming apparatus 1 will be described next in detail with reference to FIG. 2. FIG. 2 is a block diagram of the image forming apparatus 1. Specifically, FIG. 2 illustrates structure of the storage section 110 and the control section 120 for executing the masking processing in backside printing.

The storage section 110 includes a specific information storage section 111 and a masking portion data storage section 112. The storage section 110 stores therein a control program 115 in addition.

The specific information storage section 111 stores therein data of specific information that a user designates as confidential information. The data of the specific information is used for search for the confidential information from an image formed on the first side of a backside printing sheet P1. The specific information may include any of a personal name, a business connection name, a telephone number, accounting information, and a keyword (character string) indicating the confidential information, such as a program code, for example. Alternatively, the specific information may include an image indicating the confidential information, such as a confidential mark or a logotype of a company.

The masking portion data storage section 112 stores therein masking portion pattern data. The masking portion pattern data may be monochrome (e.g., black) solid image data or hatched pattern data.

The control section 120 includes an optical character recognition (OCR) section 121, a specific information determining section 122, and a masking image data generating section 123.

The OCR section 121 recognizes a character included in the scanned image data scanned by the line sensor 20. Specifically, the OCR section 121 recognizes a character included in the scanned image data generated by the line sensor 20 and then converts the character to text data.

The specific information determining section 122 determines whether or not the scanned data scanned by the line sensor 20 includes the data of the specific information stored in the specific information storage section 111 and the text data converted by the OCR section 121 includes the data of the specific information stored in the specific information storage section 111. That is, the specific information determining section 122 determines whether or not the image formed on the first side of the backside printing sheet P1 contains the confidential information. For example, the specific information determining section 122 determines whether or not the scanned data scanned by the line sensor 20 includes the data of the specific information and the text data converted by the OCR section 121 includes the data of the specific information by executing pattern matching between the scanned image data scanned by the line sensor 20 and the data of specific information and between the text data converted by the OCR section 121 and the data of the specific information. In this manner, the specific information determining section 122 determines whether or not the scanned data scanned by the line sensor 20 includes the data of the specific information and the text data converted by the OCR section 121 includes the data of the specific information.

Upon the specific information determining section 122 determining that the image formed on the first side of the backside printing sheet P1 contains the confidential information, the masking image data generating section 123 generates masking image data. Specifically, the masking image data generating section 123 generates masking image data while referencing a mask pattern stored in the masking portion data storage section 112 so that a masking image including a masking portion located in correspondence with the masking target region is formed. In a situation in which a plurality of masking target regions are present in the image formed on the first side of the backside printing sheet P1, the masking image data includes data of a masking image including a plurality of masking portions.

Figure 3:
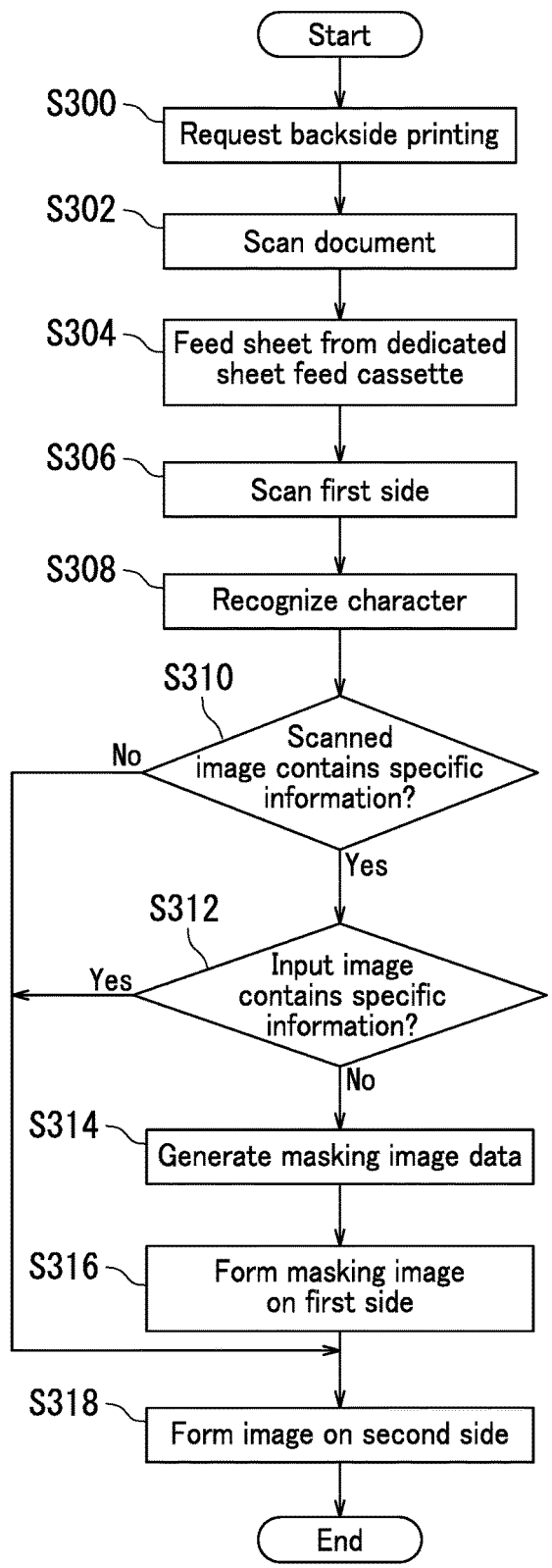
FIG. 3 is a flowchart depicting an operation of the image forming apparatus according to the first embodiment of the present disclosure.

With reference to FIGS. 1-3, an operation of the image forming apparatus 1 in backside printing will be described next. FIG. 3 is a flowchart depicting an operation of the image forming apparatus 1.

Upon receiving a request for backside printing (Step S300), the control section 120 reads out the control program 115 stored in the storage section 110 and performs backside printing. As illustrated in FIG. 3, backside printing is performed through execution of Steps S302-318. That is, a portion of the image on the first side of the backside printing sheet P1 that indicates the confidential information is masked and an image based on the input image data is then formed on the second side of the backside printing sheet P1.

Step S300: The image forming apparatus 1 receives a request for backside printing from a user.

Step S302: The document scanning section 5 scans an image of an original document to generate input image data.

Step S304: The sheet feed section 10 feeds a backside printing sheet P1 from the dedicated sheet feed cassette 11a.

Step S306: The line sensor 20 scans an image formed on the first side of the backside printing sheet P1 to generated scanned image data.

Step S308: The OCR section 121 performs character recognition. Specifically, the OCR section 121 recognizes a character in the scanned image data generated by the line sensor 20 and converts the character to text data.

Step S310: The specific information determining section 122 determines whether or not the scanned image data includes the data of the specific information stored in the specific information storage section 111. Upon the specific information determining section 122 determining that the scanned image data includes the data of the specific information (Yes at Step S310), the processing proceeds to Step S312. Upon the specific information determining section 122 determining that the scanned image data does not include the data of the specific information (No at Step S310), the processing proceeds to Step S318.

Step S312: The specific information determining section 122 determines whether or not the input image data includes the data of the specific information stored in the specific information storage section 111. Upon the specific information determining section 122 determining that the input image data includes the data of the specific information (Yes at Step S312), the processing proceeds to Step S318. Upon the specific information determining section 122 determining that the input image data does not include the data of the specific information (No at Step S312), the processing proceeds to Step S314.

Step S314: The masking image data generating section 123 generates masking image data.

Step S316: The image forming section 30 forms on the first side of the backside printing sheet P1, a masking image based on the masking image data. That is, the image forming section 30 forms a masking image including a masking portion located in correspondence with the masking target region. The backside printing sheet P1 on which the masking image is formed is conveyed to the first conveyance section L1 via the third conveyance section L3. Preferably, the masking image is formed using a color toner capable of impairing recognizability of a portion of the image on the first side of the backside printing sheet P1 that indicates the confidential information. For example, the masking image is formed with a toner of the same color as that of the portion of the image on the first side of the backside printing sheet P1 that indicates the confidential information. In the above configuration, recognizability of the confidential information can be impaired while a situation in which only a toner of a specific color is consumed can be prevented.

Step S318: The image forming section 30 forms on the second side of the backside printing sheet P1, an image based on the input image data.

Figure 4:
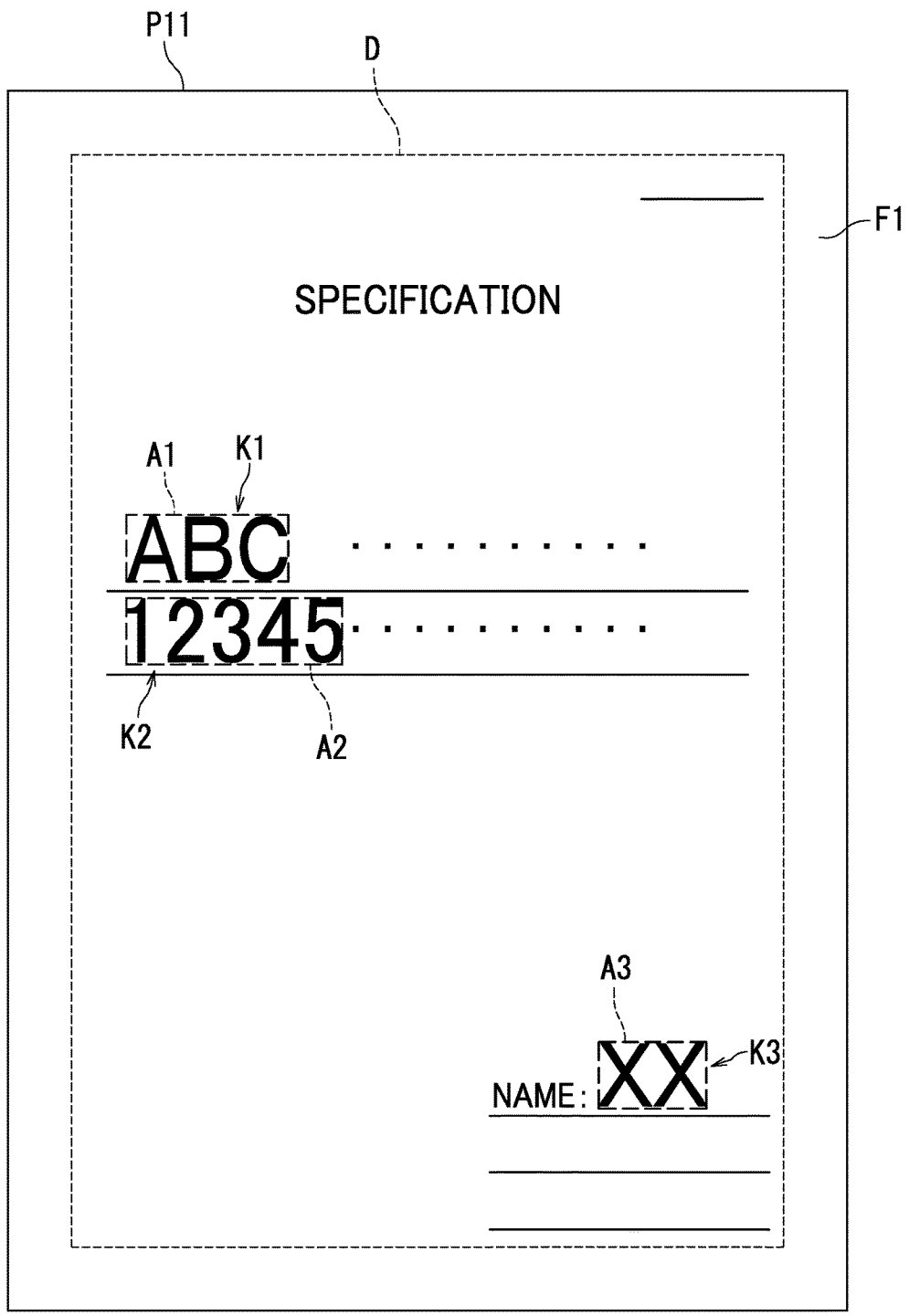
FIG. 4 is a diagram illustrating a backside printing sheet according to the first embodiment of the present disclosure.

With reference to FIGS. 1-4, detailed description will be given next about generation of masking image data that the image forming apparatus 1 performs. FIG. 4 is a diagram illustrating a backside printing sheet P11 that is an example of the backside printing sheet P1. In the present embodiment, the specific information storage section 111 stores therein pieces of data of specific information corresponding to specific information items "ABC", "12345", and "XX" that are included in the confidential information.

As illustrated in FIG. 4, an image D is already formed on a first side F1 of a backside printing sheet P11. The image D includes a confidential information portion K1, a confidential information portion K2, and a confidential information portion K3. The confidential information portion K1 is an image of the confidential information item "ABC" and is present in a masking target region A1. The confidential information portion K2 is an image of the confidential information item "12345" and is present in a masking target region A2. The confidential information portion K3 is an image of the confidential information item "XX" and is present in a masking target region A3.

The document scanning section 5 scans an original document to generate input image data. When the dedicated sheet feed cassette 11a fees a backside printing sheet P11, the line sensor 20 scans the image D to generate scanned image data. The OCR section 121 recognizes a character in the generated scanned image data and converts the character to text data. Subsequently, the specific information determining section 122 determines whether or not the input image data includes the data of the specific information stored in the specific information storage section 111 and the converted text data includes the data of the specific information stored in the specific information storage section 111. In the present embodiment, the specific information storage section 111 stores in advance the respective pieces of the data of the specific information indicating the keywords "ABC", "12345", and "XX". Therefore, the specific information determining section 122 determines that the image D contains the specific information (includes a portion that indicates confidential information). The masking image data generating section 123 accordingly generates image data (masking image data) for masking the confidential information portions K1, K2, and K3.

Figure 5:
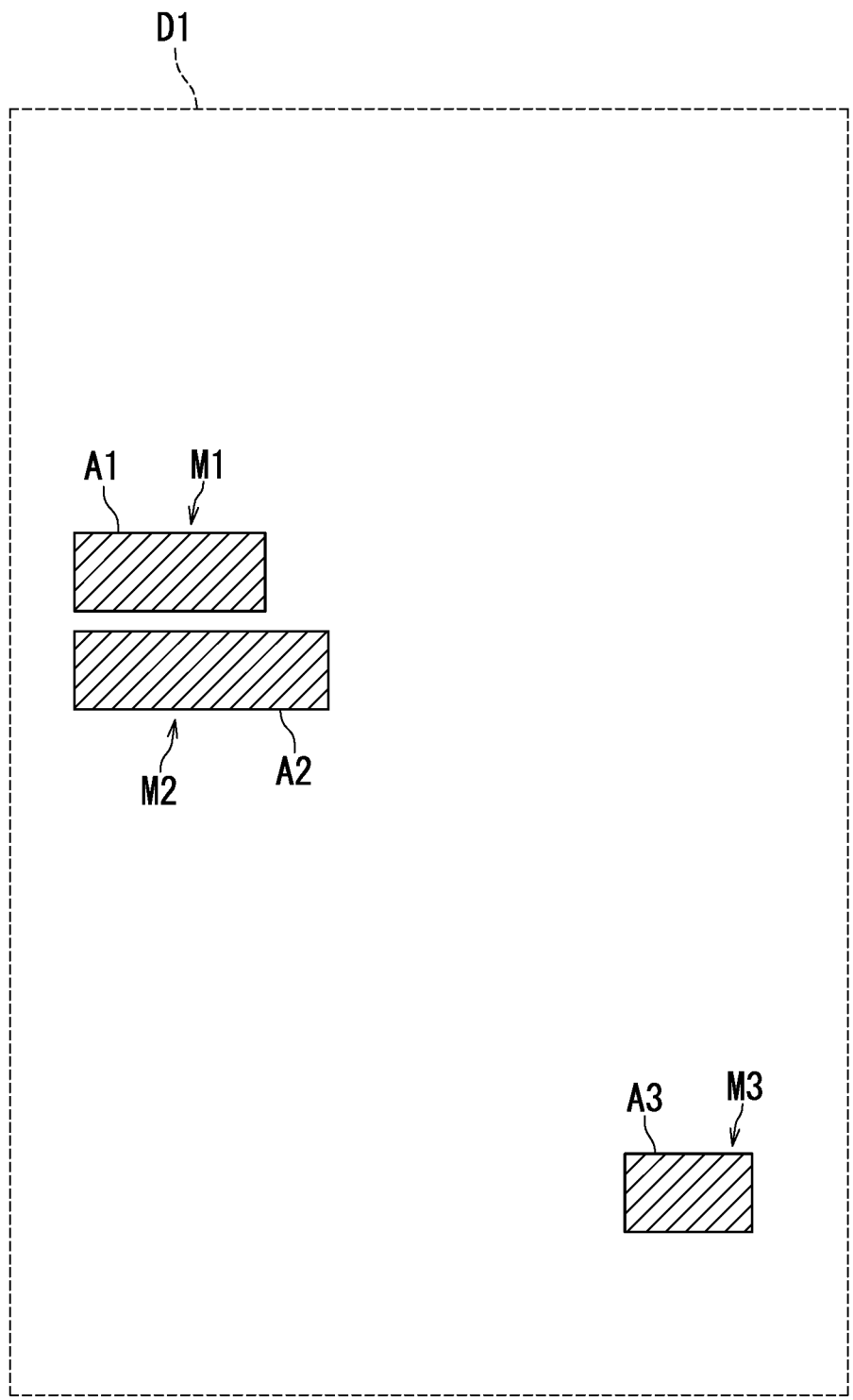
FIG. 5 is a diagram illustrating a masking image formed on a first side of the backside printing sheet according to the first embodiment of the present embodiment.

A masking image will be described next in detail with reference to FIGS. 1-5. FIG. 5 is a diagram illustrating an example masking image formed on the first side of the backside printing sheet P11 illustrated in FIG. 4. Here, masking portions will be described by referencing the masking image D1 formed on the backside printing sheet P11 as an example.

As illustrated in FIG. 4, an image including the three confidential information portions K1, K2, and K3 is formed on the first side F1 of the backside printing sheet P11. The masking image data generating section 123 accordingly generates image data of the masking image D1 including three masking portions M1, M2, and M3, as illustrated in FIG. 5, for masking the confidential information portions K1, K2, and K3. The masking image D1 is formed on the first side F1 of the backside printing sheet P11 based on the generated masking image data. As a result, the masking portions M1, M2, and M3 are formed on the masking target regions A1, A2, and A3, respectively. Thus, the confidential information portions K1, K2, and K3 are masked.

As described above, the storage section 110 of the image forming apparatus 1 stores therein the data of the specific information that a user designates as confidential information. Upon receipt of a request for backside printing in the image forming apparatus 1, the line sensor 20 scans an image formed on the first side of a backside printing sheet P1 and the control section 120 determines whether or not the scanned image includes a portion that indicates the specific information. That is, the control section 120 of the image forming apparatus 1 determines whether or not the image formed on the first side of the backside printing sheet P1 contains the designated confidential information (includes a confidential information portion). Upon the control section 120 determining that the image formed on the first side of the backside printing sheet P1 contains the confidential information and the image to be formed on the second side of the backside printing sheet P1 does not contain the confidential information, the control section 120 controls the image forming section 30 to mask a portion of the image on the first side that indicates the confidential information. In the above manner, the control section 120 of the image forming apparatus 1 controls the image forming section 30 to form on the first side of the backside printing sheet P1, a masking image including a masking portion in correspondence with the portion of the image on the first side that indicates the confidential information. By contrast, upon the control section 120 determining that the image formed on the first side of the backside printing sheet P1 contains the confidential information and the image to be formed on the second side of the backside printing sheet P1 contains the confidential information, the control section 120 controls the image forming section 30 to form an image based on the input image data on the second side without forming a masking image on the first side. Thus, printed matter containing information that a user recognizes as confidential information is not subjected to the masking processing. This can prevent leakage of the confidential information while reducing toner consumption.

The present embodiment describes a situation in which three masking target regions are included in the image formed on the first side of the backside printing sheet P11.

However, the number of the masking target regions is not limited to three and may be one, two, four, or more.

The control section 120 in the present embodiment controls the image forming section 30 to form the masking image including the masking portions located in correspondence with the masking target regions on the first side of a backside printing sheet P1. However, the control section 120 may control the image forming section 30 to form a masking image that masks the entirety of the first side of the backside printing sheet P1.

Further, the control section 120 in the present embodiment determines whether or not the image formed on the first side of the backside printing sheet P1 contains the confidential information and the image to be formed on the second side of the backside printing sheet P1 contains the confidential information by referencing the same data of the specific information. However, the control section 120 may determine whether or not the image formed on the first side of the backside printing sheet P1 contains confidential information and the image to be formed on the second side of the backside printing sheet P1 contains confidential information by referencing different data of different specific information. For example, the data of the specific information may include first specific information data for the first side of the backside printing sheet P1 and second specific information data for the second side of the backside printing sheet P1 that is different from the first data. In this configuration, the control section 120 determines whether or not the scanned image data includes the first specific information data and whether or not the input image data includes the second specific data information.

The document scanning section 5 scans an original document to generate input image data in the present embodiment. Alternatively, however, the input image data may be image data stored in the storage section 110 or image data received from an external device (not illustrated) via a network (not illustrated).

Second Embodiment

The control section 120 in the first embodiment controls the image forming section 30 to form a masking image on the first side of a backside printing sheet P1 upon determining that an image formed on the first side contains the confidential information and an image to be formed on the second side of the backside printing sheet P1 does not contain the confidential information. Alternatively, the control section 120 may determine whether or not to control the image forming section 30 to form a masking image on the first side of the backside printing sheet P1 according to a setting (mode) selected by a user.

Figure 6:
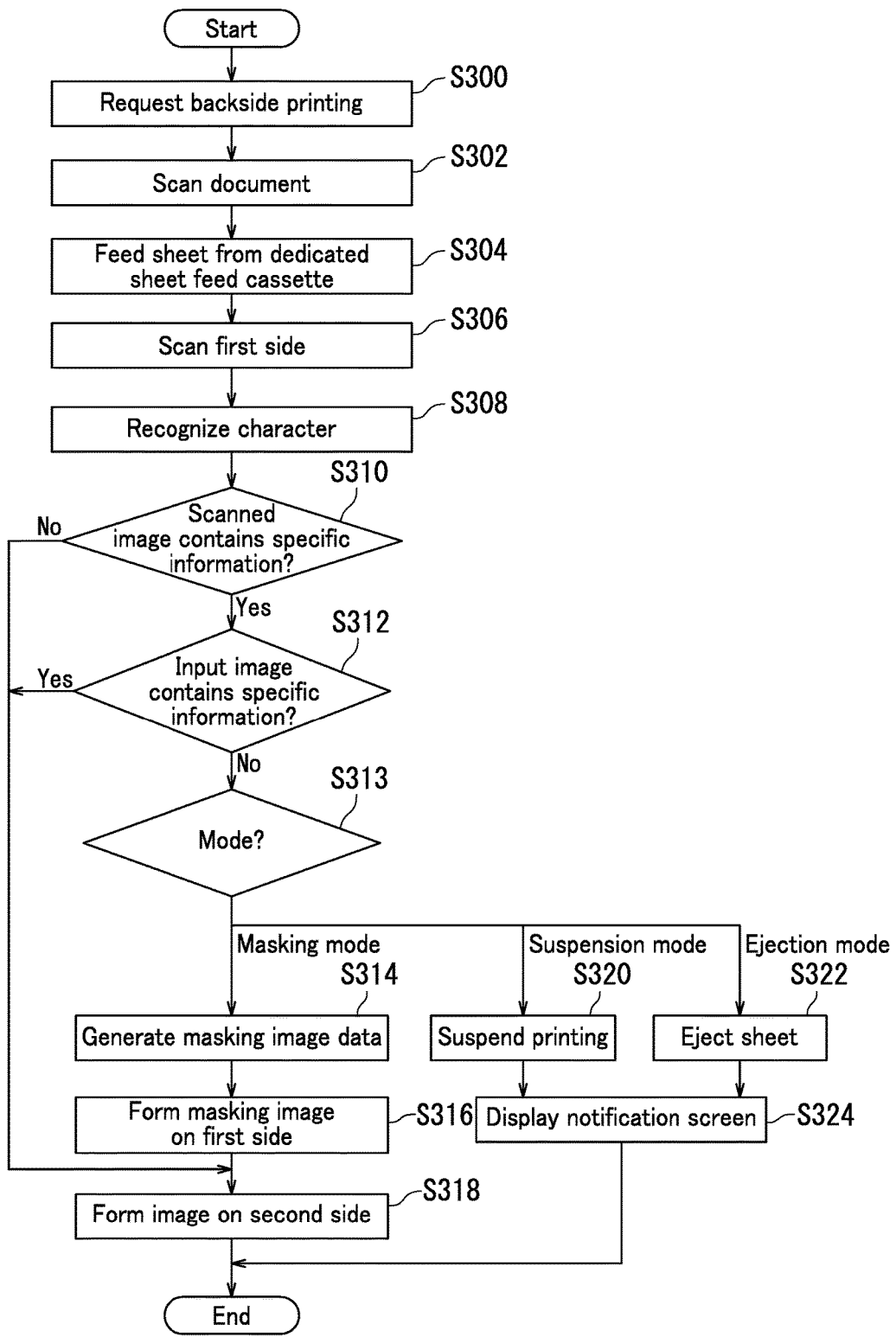
FIG. 6 is a flowchart depicting an operation of the image forming apparatus according to a second embodiment of the present disclosure.

A description will be given about an operation of the image forming apparatus 1 according to a second embodiment of the present disclosure with reference to FIGS. 1, 2, and 6. FIG. 6 is a flowchart depicting an operation of the image forming apparatus 1 according to the second embodiment. In the present embodiment, a user is allowed to select one of a plurality of settings (modes) for backside printing in a situation in which an image formed on the first side of a backside printing sheet P1 contains the confidential information and the image to be formed on the second side of a backside printing sheet P1 does not contain the confidential information. In the present embodiment, the use is allowed to select one of a masking mode, a suspension mode, and an ejection mode. The user selects one of the modes prior to, for example, execution of printing. In a situation in which the image formed on the first side of the backside printing sheet P1 contains the confidential information and the image to be formed on the second side of the backside printing sheet P1 does not contain the confidential information, a masking image is formed on the first side in the masking mode likewise in the first embodiment, printing is suspended in the suspension mode, and the backside printing sheet P1 is ejected from the ejection section 50 without formation of any image on both the first and second sides in the ejection mode.

Steps S300 to S312 are performed in the same manner as those in the first embodiment (see FIG. 3).

Step S313: The control section 120 determines which mode a user selects. Upon the control section 120 determining that the user selects the masking mode (masking mode at Step S313), the processing proceeds to Step S314. Upon the control section 120 determining that the user selects the suspension mode (suspension mode at Step S313), the processing proceeds to Step S320. Upon the control section 120 determining that the user selects the ejection mode (ejection mode at Step S313), the processing proceeds to Step S322.

Step S314: The masking image data generating section 123 generates masking image data.

Step S316: The image forming section 30 forms on the first side of the backside printing sheet P1, a masking image based on the masking image data.

Step S318: The image forming section 30 forms on the second side of the backside printing sheet P1, an image based on the input image data.

Step S320: The image forming apparatus 1 suspends printing. Specifically, the control section 120 suspends conveyance of the backside printing sheet P1 before the backside printing sheet P1 is conveyed to the image forming section 30. The processing then proceeds to Step S324.

Step S322: The image forming apparatus 1 ejects the backside printing sheet P1 from the ejection section 50. The processing then proceeds to Step S324.

Step S324: The control section 120 causes the input and output section 60 to display a notification screen. Specifically, in a situation in which the suspension mode is selected by the user, the notification screen is displayed on the input and output section 60. The notification screen is for notifying the user of printing being suspended due to the presence of the confidential information in the image on the first side of the backside printing sheet P1. The notification screen may further include a notification that causes the user to confirm whether or not to continue printing or to eject the backside printing sheet P1 without performing printing. In a situation in which the ejection mode is selected by the user, another notification screen is displayed on the input and output section 60. The notification screen is for notifying the user of the backside printing sheet P1 being ejected without being subjected to printing due to the presence of the confidential information in the image on the first side of the backside printing sheet P1.

As described above, in the second embodiment, the control section 120 of the image forming apparatus 1 determines whether an image formed on the first side of a backside printing sheet P1 contains the confidential information and an image to be formed on the second side of the backside printing sheet P1 does not contain the confidential information. Upon determining that the image formed on the first side of the backside printing sheet P1 contains the confidential information and the image to be formed on the second side of the backside printing sheet P1 does not contain the confidential information, the control section 120 determines according to a setting selected by a user whether or not the image forming section 30 is to form a masking image on the first side. In the above configuration, user desired processing can be performed in the image forming apparatus 1.

The control section 120 of the image forming apparatus 1 in the second embodiment causes the input and output section 60 to display the notification screen that indicates a notification to a user upon determining that the image formed on the first side of the backside printing sheet P1 contains the confidential information and the image to be formed on the second side of the backside printing sheet P1 does not contain the confidential information image. In the above configuration, the user can recognize the presence of the confidential information in the image formed on the first side of the backside printing sheet P1, thereby preventing leakage of the confidential information.

Embodiments of the present embodiment have been described so far with reference to the drawings (FIGS. 1-6). However, the present disclosure is not limited to the above embodiments and a wide range of alterations can be made to the embodiments so long as such alterations do not deviate from the intended scope of the present disclosure. The drawings are schematic illustrations that emphasize elements of configuration in order to facilitate understanding thereof. Therefore, properties of each of the elements of configuration, such as thickness, length, and the number may differ from actual properties of the element of configuration for the sake of illustration convenience. Also note that material properties, shapes, dimensions, and the like, described for each of the elements of configuration in the above embodiments, are only examples and are not intended to impose any particular limitations on the elements of configuration and can be modified in various manners within the scope not departing from the subject matter of the present disclosure.

For example, the image forming apparatus 1 includes a single dedicated sheet feed cassette 11a in the embodiments of the present disclosure but may include two or more dedicated sheet feed cassettes 11a.

The embodiments of the present disclosure describe a configuration in which a backside printing sheet P1 is fed from the dedicated sheet feed cassette 11a. Alternatively, however, the backside printing sheet P1 may be fed from the manual feed tray 16. In the above configuration, the line sensor 20 is disposed downstream of the manual feed tray 16 and upstream of the transfer device 35.

The image forming apparatus 1 in the above embodiments according to the present disclosure performs the masking processing on the first side of a backside printing sheet P1 and then forms an image based on the input image data on the second side of the backside printing sheet P1. Alternatively, however, the image forming apparatus 1 may form an image based on the input image data on the second side of the backside printing sheet P1 and then perform the masking processing on the first side of the backside printing sheet P1.

The present disclosure is applied to an electrographic image forming apparatus in the above embodiments but is applicable to image forming apparatuses other than the electrographic image forming apparatus, such as an inkjet image forming apparatus.

The above embodiments describe a situation in which the present disclosure is applied to a color copier. However, the present disclosure is applicable to monochrome copiers.

The present disclosure is applied to a copier in the above embodiments but is applicable to a printer, a multifunction peripheral, etc.

What is claimed is:

1. An image forming apparatus that forms an image on a recording medium having a first side and a second side opposite to the first side, comprising:
    a scanner including an image sensor that scans an image formed on the first side of the recording medium to obtain scanned image data;
    a storage section that stores therein data of specific information indicating a specific image or a specific character string and that includes at least one of a hard disk drive, a random access memory, and a read only memory;
    an image forming section configured to form an image on the recording medium; and
    a controller configured to control the scanner and the image forming section, wherein
    the image forming section includes a photosensitive drum and a development roller,
    the image forming section forms an image based on input image data on the second side of the recording medium,
    the controller determines whether or not the input image data includes the data of the specific information and the scanned image data includes the data of the specific information and determines based on a result of the determination whether or not to control the image forming section to form a masking image on the first side for masking a portion of the image on the first side that indicates the specific information,
    upon determining that the input image data does not include the data of the specific information and the scanned image data includes the data of the specific information, the controller determines based on a setting selected by a user whether or not to control the image forming section to form the masking image on the first side of the recording medium, and
    upon determining that the input image data does not include the data of the specific information and the scanned image data includes the data of the specific information, the controller controls the image forming section based on a setting selected by the user not to form an image on the first and second sides of the recording medium.

2. The image forming apparatus according to claim 1, wherein
    upon determining that each of the input image data and the scanned image data includes the data of the specific information, the controller controls the image forming section to form the image based on the input image data on the second side of the recording medium without forming the masking image on the first side of the recording medium.

3. The image forming apparatus according to claim 1, further comprising
    an input and output section configured to display an input screen and including a touch panel, wherein
    upon determining that the input image data does not include the data of the specific information and the scanned image data includes the data of the specific information, the controller causes the input and output section to display a notification screen that displays a notification on the input and output section to a user.

4. The image forming apparatus according to claim 1, wherein
    upon determining to control the image forming section to form on the first side of the recording medium the masking image for masking a portion of the image on the first side that indicates the specific information, the controller controls the image forming section to form the masking image including a masking portion located in correspondence with the portion of the image on the first side of the recording medium that indicates the specific information such that the masking portion masks the portion of the image on the first side that indicates the specific information.

5. The image forming apparatus according to claim 1, wherein upon determining to control the image forming section to form on the first side of the recording medium the masking image for masking a portion of the image on the first side that indicates the specific information, the controller controls the image forming section to form the masking image that masks an entirety of the image on the first side.

6. The image forming apparatus according to claim 1, wherein the data of the specific information includes:

first specific information data for the image formed on the first side of the recording medium; and second specific information data for the image to be formed on the second side of the recording medium, the second specific information data being different from the first specific information data, the controller determines whether or not the scanned image data includes the first specific information data and whether or not the input image data includes the second specific information data.

7. The image forming apparatus according to claim 1, wherein the character string includes any of a personal name, a business connection name, a telephone number, accounting information, and a program code.

8. The image forming apparatus according to claim 1, wherein the specific image includes any of a confidential mark or a logotype of a company.

* * * * *